June 9, 1931.  R. H. GODDARD  1,809,271
PROPULSION OF AIRCRAFT
Filed June 28, 1929   3 Sheets-Sheet 1
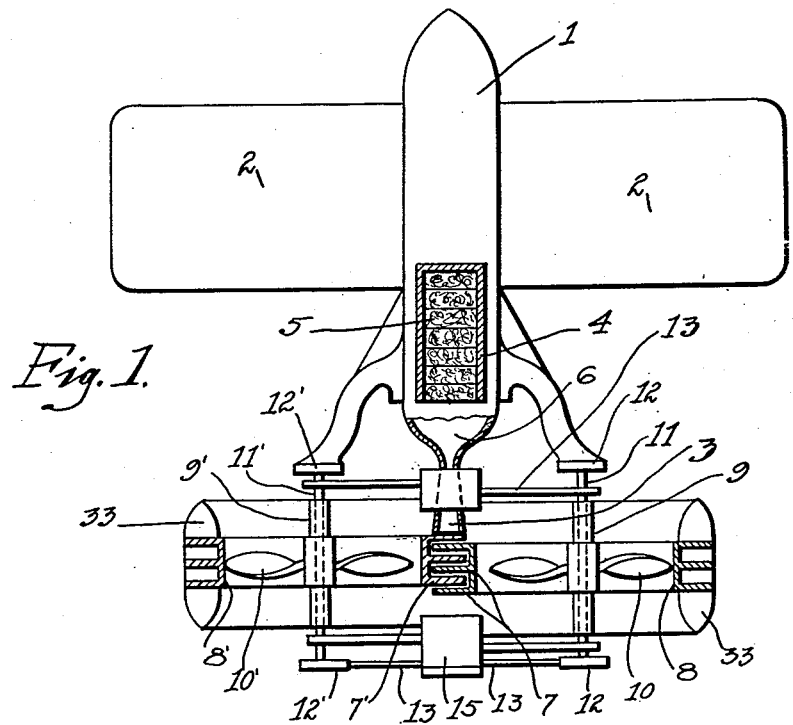
Fig. 1.
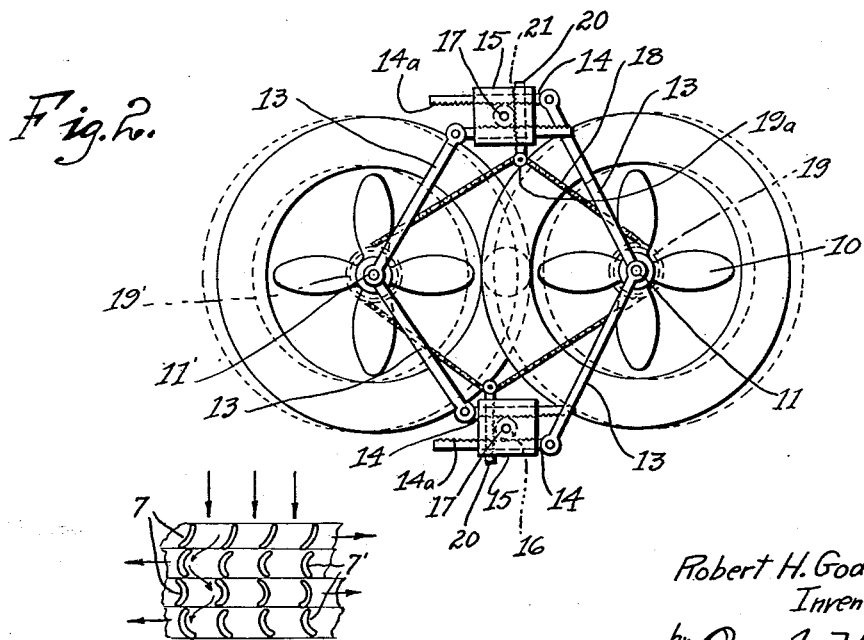
Fig. 2.
Fig. 4.
Robert H. Goddard
Inventor
by Owen N. Kennedy
Attorney June 9, 1931. R. H. GODDARD 1,809,271
PROPULSION OF AIRCRAFT
Filed June 28, 1929  3 Sheets-Sheet 2

Robert H. Goddard
Inventor
by Owen N. Kennedy
Attorney

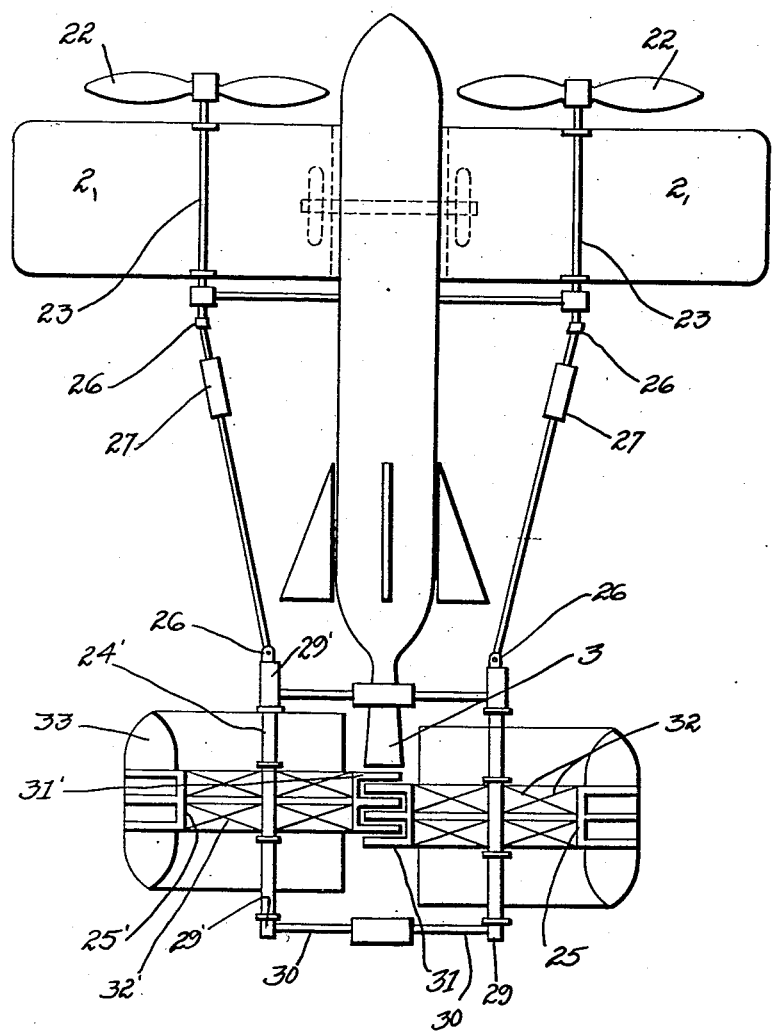

Patented June 9, 1931

1,809,271

UNITED STATES PATENT OFFICE

ROBERT H. GODDARD, OF WORCESTER, MASSACHUSETTS, ASSIGNOR OF ONE-HALF TO GEORGE CROMPTON, OF WORCESTER, MASSACHUSETTS

PROPULSION OF AIRCRAFT

Application filed June 28, 1929. Serial No. 374,439.

The present invention relates to the propulsion of aircraft by means of a blast of gas delivered at high velocity from what is commonly known in the art as a rocket and the object of the invention is to provide an improved manner and means for utilizing the energy of the gas blast to obtain a maximum propelling effect for an aircraft.

While I am aware of the fact that rockets alone have heretofore been employed for propelling an aircraft, with or without planes, all such previous attempts at aircraft propulsion by means of rockets have depended solely upon the reaction of the gases ejected from the rocket for their propulsive effect. The gases ejected from a rocket travel at great velocity and possess tremendous kinetic energy, and consequently at ordinary low altitudes with pure rocket propulsion most of the heat energy of the fuel, or charge, of the rocket is dissipated as kinetic energy of the ejected gases, leaving a comparatively small proportion of the total energy of the charge available for propelling the carrier on which the rocket is mounted at a relatively slow speed, as compared to the speed of the gases themselves.

The present invention proposes to utilize to the best possible advantage the energy of the gas blast to obtain a maximum propulsive effect for the aircraft, under varying conditions of operation resulting from propelling the aircraft at different altitudes. Briefly stated, the invention contemplates the utilization of the high velocity gases to drive one or more turbine elements which in turn operate propellers for driving the plane in the usual manner when operating at relatively low altitudes where the air is dense. In this conversion of the energy of the gases into mechanical power, the velocity of the ejected gases is reduced to a low value and the energy of the gases is transferred with high efficiency to the much larger mass of air handled by the propellers. The invention also contemplates means whereby when the aircraft rises to higher altitudes in which the air is less dense, the energy of the gas blast can be used partly to drive the propellers and partly to add to their propelling effect by the reaction of the gas blast itself, or in other words by pure rocket action. And then when the air craft rises still higher, where the air would be so thin as to make the propellers useless, the invention provides means whereby the turbine elements can be moved entirely out of the path of the gas blast, whereupon the aircraft is propelled entirely by the rocket effect. The above and other advantageous features of my invention will hereinafter more fully appear with reference to the accompanying drawings, in which—

Fig. 1 is a plan view of an aircraft embodying my invention.

Fig. 2 is a view in end elevation of the parts shown in Fig. 1, certain portions being shown in section.

Fig. 4 is a fragmentary view showing details of the turbine construction on an enlarged scale.

Fig. 5 is a plan view similar to Fig. 1 showing a modification in the manner of driving the aircraft propellers.

Like reference characters refer to like parts in the different figures.

Figure 3:
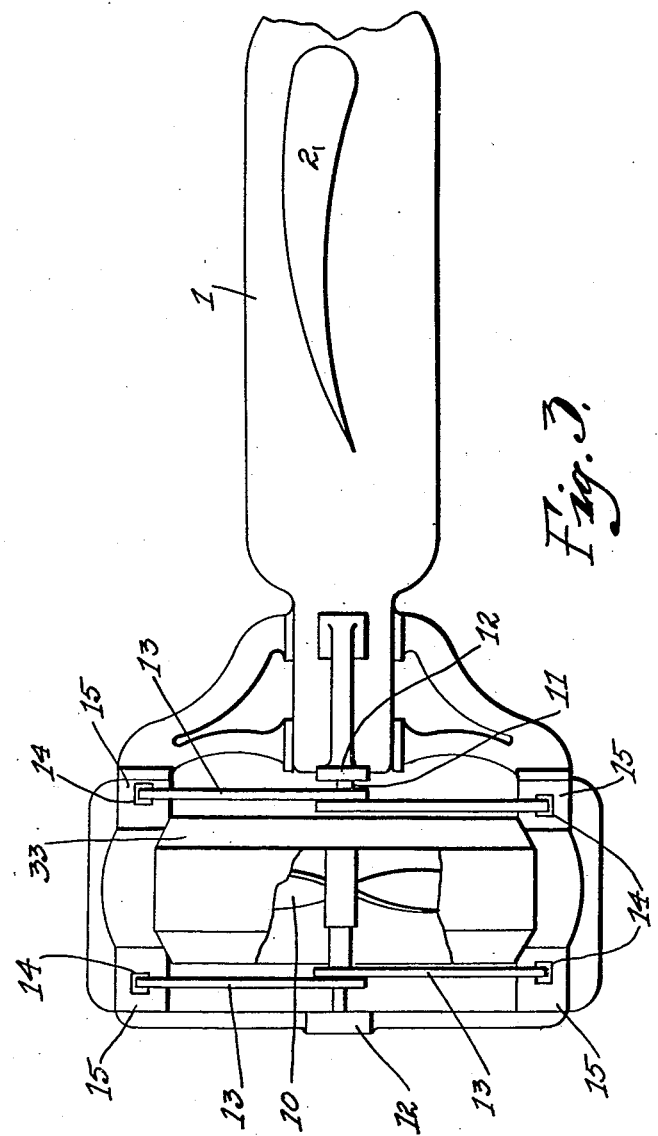
Fig. 3 is a view in side elevation of the aircraft shown in Fig. 1, on an enlarged scale.

Referring first to Fig. 1, the body 1 of the aircraft provides suitable planes or wings 2 of any desired type mounted forwardly of the body 1, while the rear of the body 1 provides a nozzle 3 to which is delivered a blast of gas at high velocity resulting from the combustion of a suitable fuel in a container or rocket 4 having its discharge end located adjacent to the rear opening of the nozzle 2. It is more or less immaterial, in so far as the present invention is concerned, as to just how the blast is produced at the nozzle 3, but for purposes of illustration the container or rocket 4 is shown as being of the type shown and described in my Patent No. 1,102,653 issued July 7, 1914, in which a number of charges 5 are adapted to be ignited within a combustion chamber 6 to produce a continuous blast of gas at high velocity through the nozzle 3. Obviously the rocket 4 may utilize solid, liquid or gaseous fuel for its charge, and suitable means may be provided for replenishing the charge of the rocket in accordance with the consumption of the fuel.

As shown in Fig. 1, the gas blast ejected rearwardly from the nozzle 3, instead of discharging into the open air as in the case of a rocket, impinges upon the blades 7 and 7' of one or more turbine wheels 8 and 8' rotatably mounted on parallel shafts 9 and 9' equally spaced on opposite sides of the axis of the nozzle 3. As best shown in Fig. 4, the first set of vanes 7 of the wheel 8 are so formed as to deflect the gas blast tangentially towards a set of vanes 7' on wheel 8' curved oppositely with respect to the vanes 7 so that the gas blast impinging upon the first set of vanes 7 causes them to be moved in the direction of the arrow, whereas impingement of the gases upon the first set of vanes 7' causes movement of these vanes in the opposite direction, also as indicated by the arrow. As a result of driving the vanes 7 and 7' in opposite directions, the turbine wheels 8 and 8' are adapted to be driven in the same direction of rotation as indicated by the arrows in Fig. 2. Preferably the turbine wheels 8 and 8' are provided with several sets of vanes or blades 7 and 7' so that the turbine wheels will operate on the multi-staged principle as shown in Fig. 4. As shown, the first set of vanes 7' of the turbine wheel 8' are curved so as to deflect the gases to a second set of vanes 7 on the wheel 8, 8 which vanes 7 in turn serve to deflect the gases again to a second set of vanes 7' and so on for the total number of stages. For a given propeller speed, the number of stages provided is just sufficient to reduce the velocity of the gas to a very low value after passing all the stages so that by the time the blast of gas has passed through all the stages, practically all of its energy will be transferred to the turbine wheels 8 and 8'. Obviously, the greater the number of stages provided by the turbine blades, the lower can be the propeller speed for the complete conversion of a given amount of energy of the gas blast.

In order to propel the aircraft, the wheels 8 and 8' are each provided with propeller blades 10 and 10' arranged within the turbine vanes and symmetrical about the axes of the shafts 9 and 9' on which the turbine wheels are adapted to rotate. Therefore when a blast of gas is discharged by the nozzle 3, the kinetic energy of the gas will be converted into rotation of the propeller blades 10 and 10' thereby propelling the body 1 as an aeroplane, this conversion of the energy of the gas being brought about with a high efficiency, particularly when the turbine wheels 6 and 6' operate on the multi-stage principle. In the foregoing description, it has been assumed that the vanes 7 and 7' of the turbine wheels 8 and 8' absorb substantially all of the energy of the blast gas, but as previously pointed out my invention further contemplates an arrangement whereby the amount of energy that is absorbed by the turbine wheels can be varied so that the body 1 can be propelled through the air partly by the propeller blades 10 and 10' and partly by a portion of the blast of gas acting on the rocket principle, and this arrangement will next be described.

As shown in Fig. 1, the shafts 9 and 9' carrying the turbine wheels 8 and 8' are hollow and are adapted to rotate freely on relatively fixed supporting axles 11 and 11', the ends of which are nonrotatably and slidably supported in guides 12 supported by the body of the aircraft. The axles 11 and 11' are each pivotally connected at opposite ends to pairs of divergent arms 13, the other ends of the arms 13 being pivotally connected to pairs of plungers 14 slidably mounted in guides 15 disposed above and below the axis of the nozzle 3 and supported by the body of the aircraft, see Fig. 3. The plungers 14 of each pair provide oppositely facing rack teeth 14a which are in mesh with the teeth of a pinion 16 mounted on a shaft 17, rotatably supported by a guide 15 between a pair of plungers 13 so that turning of a shaft 17 will cause the plungers 14 to move in opposite directions. By turning the shafts 17 in unison, the arms 12 supporting the axles 11 and 11' may be caused to shift the turbine wheels 8 and 8' bodily in opposite directions with respect to the axis of the discharge nozzle 3. By thus shifting the turbine wheels with respect to the nozzle 3, the degree to which the blast of gas impinges upon the turbine vanes 7 and 7' can be varied. In Fig. 2, the turbine wheels 8 and 8' are shown in such a position that the vanes 7 and 7' receive and absorb the entire energy of the blast of gas from the nozzle 3, in which case the body of the aircraft is propelled entirely by rotation of the propeller blades 10 and 10'.

As indicated in dotted lines, however, the turbine wheels 8 and 8' may be separated so that only a portion of the total energy of the blast is absorbed by the vanes 7 and 7', so that for this position of parts the aircraft is driven partly by the propeller blades 10 and 10' and partly by the reaction of a portion of the gas blast that is by rocket action. The relation between the turbine vanes 7 and 7' and the nozzle 3 shown in dotted lines in Fig. 2 is particularly advantageous when operating the aircraft at very high altitudes in which the density of the air is so reduced as to lower the efficiency of the propeller blades and to increase the efficiency of the blast of gas itself as a propelling medium, the speed of the aircraft at such an altitude being considerable in excess of the speed possibly attainable when utilizing the propeller blades alone to propel the craft.

Upon further separating the turbine wheels 8 and 8' from the dotted line position of Fig. 2, obviously the vanes 7 and 7' can be entirely moved out of the influence of the gas blast so that there is no impingement whatever of the gas upon the vanes 7 and 7'. When this condition is attained, the aircraft will be propelled entirely on the rocket principle, wherein the reaction of the gas blast alone is so great that it propels the aircraft. Obviously the entire removal of the turbine vanes 7 and 7' from the path of the gas blast will only be employed when the craft has risen to such a high altitude that the propeller blades are rendered useless, at which altitude the air will offer substantially no resistance to the passage of the aircraft and speeds of several hundreds of miles per hour will be readily attained.

In order that the spaced turbine wheels 8 and 8' will always be driven at the same speed so as to cause the propeller blades 10 and 10' to exert an equal thrust on the air, a speed equalizing chain 18 is employed as shown in Fig. 2. This chain 18 passes around gears 19 adapted to turn with the turbine wheel shafts 10 and also passes over and under gears 19a carried at the ends of vertically movable rods 20. Each rod 20 provides rack teeth 21 in engagement with a pinion 16 so that should the turbine wheels 8 and 8' be moved apart the gears 19a will also be moved away from each other so as to hold the chain 18 tight. Thus the chain 18 is adapted to always cause the turbine wheels 8 and 8' to be rotated exactly the same speed for obviously any tendency for one turbine wheel to rotate faster than the other one will result in the chain 18 driving the other wheel at the same speed.

Referring now to Fig. 5, there is shown an arrangement in which the aircraft is adapted to be driven by means of propellers 22 mounted in front of the wings 2, in accordance with the usual practice. Each propeller 22 is carried by a shaft 23 which extends rearwardly and is connected to a shaft 24 of the turbine wheel 25 by means of two universal joints 26 and a telescoping joint 27 disposed between two shaft portions 28 extending from the universal joints 26. The shaft 24 of the turbine wheel 25 is rotatably mounted in sleeves 29 surrounding the shaft 24 and the sleeves 29 are pivotally secured to pairs of arms 30, in the same manner as the arms 12 are connected to the axles 11 in Fig. 1. The arms 30 are adapted to be moved in unison to separate the turbine wheels 25 by the same arrangement of plungers and pinions that is employed for moving the arms 12, so that this mechanism need not be described again herein.

The turbine wheels 25 and 25' provide sets of vanes 31 and 31' which cooperate with the gas discharge nozzle 3 in substantially the same manner as do the vanes 7 and 7', the vanes 31 being connected at their inner periphery to the shafts 24 and 24' by means of wire spokes 32 so that the portions of the wheels 25 inside the vanes 31 offer practically no air resistance. When the turbine wheels 25 and 25' are shifted with respect to the axis of the nozzle 3 to vary the driving effect, the telescoping joints 27 between the shaft portions 28 permit the axes of the shafts 24 to be shifted without disturbing the driving connections between the shafts 24 and the propellers 22.

In both Figs. 1 and 5 it will be noted that the turbine wheels 8 and 8' and 25 and 25' are enclosed around their outer peripheries by annular housings 33 having a stream line form, so that the air resistance of the turbine vanes is reduced to a minimum. In Fig. 2, the central portions of the wheels 8 and 8' are occupied by the propeller blades 10 and 10', while in Fig. 5 the central portions of the wheels 25 and 25' are occupied by the wire spokes 32; consequently the turbine wheels which constitute the prime mover of the aircraft offer practically no air resistance.

While there is shown in the drawings certain illustrative embodiments of my invention, it is obvious that structural details may be altered without departing in any way from the principles underlying my invention, namely the conversion of the energy of a blast of gas travelling at high velocity into mechanical power, with a high efficiency, in order to effect the propulsion of an aircraft. I desire therefore that only such limitations be imposed thereon as may come within the scope of the appended claims.

I claim,

1. In an aircraft, the combination with a source of energy and means for creating a blast of gas traveling at high velocity from said source of energy, of turbine wheels rotatable on axes disposed on opposite sides of said gas blast with propelling vanes on both of said wheels disposed in the path of said gas and a series of air propeller blades disposed within the vanes of each wheel.

2. In an aircraft, the combination with a source of energy and means for creating a blast of gas traveling at high velocity from said source of energy, of turbine wheels rotatable on spaced parallel axes on opposite sides of said gas blast and interfitting propelling vanes on both of said turbines disposed in the path of the propelling vanes of said gas blast to give a multistage effect, said turbine wheels being in surrounding relation to propellers for driving said aircraft.

3. In an aircraft, the combination with a source of energy and means for creating a blast of gas traveling at high velocity from said source of energy, of turbine wheels providing propelling vanes projecting into the gas blast from opposite sides thereof and carrying air propellers within the vanes and means for varying the degree of the impingement of the gas blast on said turbine propelling vanes.

4. In an aircraft, the combination with a source of energy and means for creating a blast of gas traveling at high velocity from said source of energy, of turbine wheels mounted on spaced parallel axes on opposite sides of said gas blast providing propelling vanes located in the blast and means for shifting the axes of said turbine wheels whereby to vary the amount of energy absorbed from said gas blast by said turbine wheels.

5. In an aircraft, the combination with a source of energy and means for creating a blast of gas traveling at high velocity from said source of energy, of turbine wheels mounted on spaced parallel axes on opposite sides of said gas blast, propellers connected to said turbine wheels for driving said aircraft and means for shifting the axes of said turbine wheels to vary the degree of the impingement of the gas blast on propelling vanes carried by said wheels, whereby said aircraft may be propelled partly by said propellers and partly by the rocket action of the gas blast.

6. In an aircraft, the combination with a plurality of turbine wheels each adapted to receive a rotative force from a common source of propelling medium, propellers driven by said turbine wheels and means for varying the relation between said wheels and the propelling medium, of means for maintaining said turbine wheels in synchronism under varying operating conditions.

7. In an aircraft, the combination with a plurality of turbine wheels each adapted to receive a rotative force from a common source of propelling medium consisting of a blast of gas at high velocity, propellers driven by said wheels for driving said aircraft, and means for varying the degree of impingement of said gas blast upon said turbine wheels, of means for maintaining said turbine wheels in synchronism for different degrees of impingement of said gas blast.

8. In a prime mover of the turbine type, a pair of wheels adapted to receive their propulsion from a gas blast travelling parallel to and between the axes of rotation of said wheels, each of said wheels providing a set of vanes adapted to deflect the gas blast tangentially of the wheel, whereby said wheels are adapted to be simultaneously driven in the same direction of rotation.

9. In an aircraft, means for creating a blast of gas at high velocity, a nozzle therefor, a screw propeller, turbine blades, an operative connection between said propeller and said blades, and means for relatively moving said blades with respect to said blast for varying the amount of energy transmitted to the blades, the nozzle and the blades being so disposed that the blast acts directly on the air for rocket propulsion, the rocket propulsion impulse being large when the amount of energy transmitted to the blades is small and vice versa, and the axis of the blast when the blades are so disposed as to allow some rocket impulse being substantially the same as said blast strikes the atmosphere as it was upon first striking the blades.

10. In an aircraft, means for creating a blast of gas at high velocity, a nozzle therefor, a screw propeller, turbine blades, an operative connection between said propeller and said blades, and means for relatively moving said blades with respect to said blast for varying the amount of energy transmitted to the blades, the axis of the blast when any appreciable amount thereof is allowed to emerge from said blades being unchanged after it leaves said blades and being substantially the same as its average angular position when acting on said blades and being so disposed with relation to the aircraft as to give a rocket impulse thereto.

ROBERT H. GODDARD.